United States Patent [19]

Mudge

[11] Patent Number: 4,753,846

[45] Date of Patent: Jun. 28, 1988

[54] ADHESIVE COMPOSITIONS FOR USE ON VINYL SUBSTRATES

[75] Inventor: Paul R. Mudge, Somerville, N.J.

[73] Assignee: National Starch and Chemical Corporation, Bridgewater, N.J.

[21] Appl. No.: 9,450

[22] Filed: Feb. 2, 1987

[51] Int. Cl.$^4$ .................. C08F 20/10; C09U 7/02; C09J 7/02; B32B 27/08

[52] U.S. Cl. .................. 428/343; 428/355; 428/518; 526/318.43; 526/318.44

[58] Field of Search .................. 526/318.43, 318.44; 428/343, 355, 518

[56] References Cited

U.S. PATENT DOCUMENTS

| | | | |
|---|---|---|---|
| 2,480,551 | 9/1949 | Coffman et al. | 526/324 |
| 2,965,617 | 12/1960 | MacDonald | 526/318 |
| 3,201,374 | 8/1965 | Simms | 526/318.43 X |
| 3,268,357 | 8/1966 | Hart et al. | 117/122 |
| 3,483,171 | 12/1969 | Kühlkamp et al. | 526/318 |
| 3,485,896 | 12/1969 | Popa et al. | 260/901 |
| 3,491,070 | 1/1970 | Weaver | 260/80.73 |
| 3,501,440 | 3/1970 | Kamio et al. | 526/318.43 X |
| 3,639,326 | 2/1972 | Kray et al. | 526/324 |
| 3,657,174 | 12/1967 | Glabisch et al. | 526/318 |
| 3,690,937 | 9/1972 | Guse et al. | 526/318 |
| 3,723,397 | 3/1973 | Hoh et al. | 526/318 |
| 3,755,237 | 8/1973 | Isaacs et al. | 526/324 |
| 3,823,108 | 7/1974 | Bissot | 526/318 |
| 3,917,890 | 11/1975 | Levy | 428/228 |
| 3,923,752 | 12/1975 | Güse et al. | 526/318 |
| 3,969,560 | 7/1976 | Lewis et al. | 526/318.43 X |
| 3,971,766 | 7/1976 | Ono et al. | 526/318.43 X |
| 3,998,997 | 12/1976 | Mowdood et al. | 526/271 |
| 4,048,411 | 9/1977 | Mietzner et al. | 526/324 |
| 4,053,269 | 10/1977 | Levy | 425/113 |
| 4,073,779 | 2/1978 | Wiest et al. | 526/318 |
| 4,076,569 | 2/1978 | Buchbinder | 156/242 |
| 4,151,146 | 4/1979 | Patella | 526/318.43 X |
| 4,175,156 | 11/1979 | Ikins | 428/336 |
| 4,210,739 | 7/1980 | Gallagher et al. | 526/325 |
| 4,245,076 | 1/1981 | Marquardt | 526/318 |
| 4,273,145 | 6/1981 | Lester | 132/1 R |
| 4,299,941 | 11/1981 | Narisawa et al. | 526/324 |
| 4,322,516 | 3/1982 | Wiest et al. | 526/306 X |
| 4,391,853 | 7/1983 | Pointon | 427/152 |
| 4,484,574 | 11/1984 | DeRusha et al. | 128/156 |
| 4,507,429 | 3/1985 | Lenney | 524/800 |
| 4,547,428 | 10/1985 | Bekker et al. | 526/324 |
| 4,560,720 | 12/1985 | Aoyagi et al. | 524/288 |
| 4,564,664 | 1/1986 | Chang et al. | 526/318.43 X |
| 4,684,790 | 8/1987 | Greenhalgh | 219/505 |

FOREIGN PATENT DOCUMENTS

| | | | |
|---|---|---|---|
| 0185356 | 12/1985 | European Pat. Off. | |
| 1123879 | 8/1968 | United Kingdom | 526/324 |
| 1188635 | 4/1970 | United Kingdom | 526/324 |
| 1430186 | 3/1976 | United Kingdom | |

OTHER PUBLICATIONS

Stratton, William, "High Shear PS Emulsion Works at High Temperatures," Adhesives Age, Jun. 1985, pp. 21–23.

Dhal, Pradeep K., et al, "Pressure Sensitive Adhesives of Acrylic Polymers Containing Functional Monomers," Polymer, 1982, vol. 23, Jun., p. 937.

CA96(22)184028b; Chemical Abstract; Sayno Chemical Industries, Ltd. patent application JP 56/167791 "Low-temperature Flow Improvers".

CA102(8):64744c; Chemical Abstract; Mitsubishi Electric Corp. patent application JP 59/138695 "Pour Point Depressants for Crude Petroleum".

Primary Examiner—George F. Lesmes
Assistant Examiner—D. R. Zirker
Attorney, Agent, or Firm—Ellen T. Dec; Edwin M. Szala

[57] ABSTRACT

Adhesive compositions having a Tg of −45° to −25° C. suitable for application to plasticized polyvinyl chloride comprising 30–70% by weight of a vinyl ester of a alkenoic acid; 10–30% by weight ethylene; 20–40% by weight of a di-2-ethylhexyl maleate or di-n-octyl maleate or the corresponding fumarate; and 1 to 10% by weight of a mono-carboxylic acid.

10 Claims, No Drawings

ADHESIVE COMPOSITIONS FOR USE ON VINYL SUBSTRATES

BACKGROUND OF THE INVENTION

This invention relates to pressure sensitive adhesive compositions particularly adapted for use on vinyl substrates. These adhesives comprise polymers of ethylene, vinyl ester, di-2-ethylhexyl maleate or di-n-octyl maleate or the corresponding fumarate, and an unsaturated monocarboxylic acid.

Pressure-sensitive adhesives function to provide instantaneous adhesion when applied under light pressure. They are characterized by having a built-in capacity to secure this adhesion to a surface without activation, such as by treatment with solvents or heat, and also by having sufficient internal strength so that the adhesive material will not rupture before the bond between the adhesive material and the surface ruptures. The capacity to obtain instantaneous adhesion is usually expressed as the amount of "tack" or "tackiness". Ordinarily it is desirable to obtain as much tack as possible without losing a significant amount of internal strength (cohesion). The latter balance of adhesive and cohesive properties has been difficult to obtain in adhesive polymers since monomers conventionally incorporated into the polymers to increase the cohesive strength generally result in a decrease in adhesive tack.

A specific class of pressure sensitive adhesives are used on vinyl substrates such as are utilized in a wide variety of industrial applications including as vinyl roof tops in automobiles, for decorative trim as in vinyl labels, and decals and in specialty types. Unlike common polyolefin films such as polyethylene and polypropylene, these polyvinyl chloride (PVC) films by nature of their process requirements and high glass transition temperature, require formulation with a number of additives. Some of these are migratory components and will affect the long-term performance of a vinyl decal or label. The amounts and types of additives vary among vinyl formulations, therefore, a wide range of vinyl characteristics are available. A typical flexible PVC film formulation contains a number of additives including plasticizers. Plasticizers used include the migratory monomeric types such as phthalate esters (e.g., dioctylphthalate) or the less migratory polymeric plasticizers (e.g., polyesters, epoxidized soybean oils). These applications require stringent requirements on the adhesive composition. In particular, the vinyl substrates contain substantial amounts of these plasticizers which tend to migrate into the adhesive, especially after aging, the migration of which will destroy the adhesive and cause the bond to fail.

Thus, the use of adhesive-coated flexible polyvinylchloride films has traditionally been plagued, to various degrees, by deterioration of properties due to migration of plasticizer out of the PVC film into the adhesive coating. The degree to which this occurs is dependent on the PVC formulation and the adhesive used. In addition to resistance to this plasticizer migration on aging, adhesives for use on vinyl decals must also possess the previously discussed high initial peel values both cohesive and adhesive strength and must inhibit resistance to shrinkage.

Two of the most important factors influencing the real-life performance of an adhesive-coated vinyl decal or label are the plasticizer type and level in a PVC film. These additives which allow use of PVC for flexible applications are a major cause of the deterioration of polymer coatings applied to PVC. As a result of their more migratory character, monomeric plasticizers will have a bigger effect on adhesive properties than will polymer plasticizers. All else being equal, the higher the content of monomeric plasticizer in a vinyl film, the more deterioration experienced by the adhesive-coated decal as a function of time.

To accurately predict the extent of plasticizer migration and its effects on adhesive properties, it is important to address what happens to the plasticizer when it leaves the vinyl film. If the adhesive totally blocks out the plasticizer, the result is an accumulation of plasticizer at the adhesive-vinyl interface. This can result in bond failure at this boundary. If the adhesive is too accepting of the plasticizer, the viscoelastic properties of the adhesive deteriorate resulting in a weak, leggy polymer film. A third possibility involves migration of the plasticizer out of the PVC, through the adhesive mass, to the adhesive-substrate interface. This can retard or destroy bond formation.

The destiny of the plasticizer after the migration process is actually a combination of these three extremes. The degree to which one case predominates is dependent on adhesive, substrate and the PVC backing. The most obvious indication of plasticizer migration related adhesive deterioration is the degradation of adhesive properties as a function of aging on vinyl. Many adhesive systems display a dramatic drop off in peel adhesion and creep resistance during contact with plasticized vinyl; however, through proper polymer design, control over the migration process and the subsequent effect on the pressure sensitive adhesive properties can be achieved.

SUMMARY OF THE INVENTION

In contrast to the adhesive compositions of the prior art, the problems associated with plasticizer migration are overcome in accordance with the present invention by use of a pressure sensitive adhesive comprising 30–70% by weight of a vinyl ester of a alkenoic acid; 10–30% by weight ethylene; 20–40% by weight of a di-2-ethylhexyl maleate or di-n-octyl maleate or the corresponding fumarate; and 1 to 10% by weight of a mono-carboxylic acid.

The adhesives are characterized by superior resistance to plasticizer migration, resulting in excellent overall adhesive properties after storage of the adhesive coated substrates accompanied by high initial peel strength. As such, the pressure sensitive adhesives find particular application for adhering vinyl substrates and especially for use as adhesive for vinyl decals.

DESCRIPTION OF THE PREFERRED EMBODIMENTS

The vinyl esters utilized herein are the esters of alkanoic acids having from one to about 13 carbon atoms. Typical examples include; vinyl formate, vinyl acetate, vinyl propionate, vinyl butyrate, vinyl isobutyrate, vinyl valerate, vinyl-2-ethyl-hexanoate, vinyl isooctanoate, vinyl nonate, vinyl decanoate, vinyl pivalate, vinyl versatate, etc. Of the foregoing, vinyl acetate is the preferred monomer because of its ready availability and low cost. The vinyl ester is present in the copolymer in amounts of about 30 to 70% by weight, preferably 40 to 60%.

The dioctyl maleate isomers utilized herein are the di-2-ethylhexyl maleates or di-n-octyl maleates with the di-2-ethylhexyl esters of maleic acid being preferred. Since, after polymerization, the structure of the fumarate and maleate (the cis and the isomers) are the same, the corresponding fumarate esters are also contemplated for use herein. The latter components are present in the copolymer in amounts of about 20 to 40% by weight, preferably 25 to 35%.

The unsaturated mono-carboxylic acids utilized herein include, for example, acrylic and methacrylic acid or the half esters of maleic acid such as monoethyl, monobutyl or monooctyl maleate, with acrylic acid or monoethyl maleate being preferred. The acid is present in an amount of 1 to 10% by weight, preferably 2 to 6%.

In addition to the 10 to 30% ethylene, it may also be desired to incorporate in the copolymer minor amounts of other functional comonomers. Suitable copolymerizable comonomers include, for example, acrylamide, allyl carbamate, N-methylol (meth)-acrylamide, N-vinylpyrrolidinone, diallyl adipate, triallyl cyanurate, butanediol diacrylate, allyl methacrylate, etc. as well as $C_2$–$C_3$ hydroxyalkyl esters such as hydroxyethyl acrylate, hydroxy propyl acrylate and corresponding methacrylates. The latter comonomers are generally used at levels of less than about 5% depending upon the nature of the specifc comonomer. In all cases, the $T_g$ of the resultant pressure sensitive adhesive should be within the range of about −45° to 25° C. so the optional comonomers should not be added at levels which will result in polymers outside this $T_g$ range.

In addition, certain copolymerizable monomers which assist in the stability of the copolymer emulsion, e.g., vinyl sulfonic acid, are also useful herein as latex stabilizers. These optionally present monomers, if employed, are added in very low amounts of from 0.1 to about 2% by weight of the monomer mixture.

Conventional batch, semi-batch or continuous emulsion polymerization procedures may be utilized herein. Generally, the monomers are polymerized in an aqueous medium under pressures not exceeding 100 atmospheres in the presence of a catalyst and at least one emulsifying agent.

The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitably employed. The mixture is thoroughly agitated to dissolve the ethylene, agitation being continued until substantial equilibrium is achieved. This generally requires about 15 minutes. However, less time may be required depending upon the vessel, the efficiency of agitation, the specific system, and the like.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion.

The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The emulsifying agents are those generally used in emulsion polymerization, as well as optionally present protective colloids. It is also possible to use emulsifiers alone or in mixtures with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid, Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to about 10, preferably from about 2 to about 8, weight percent of the monomers used in the polymerization.

The emulsifier used in the polymerization can also be added, in its entirety, to the initial charge to the polymerization zone or a portion of the emulsifier, e.g. from 90 to 25 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The polymerization reaction is generally continued until the residual vinyl acetate, monomer content is below about 1%. The completed reaction product is then allowed to cool to about room temperature, while sealed from the atmosphere.

The adhesive emulsions are produced and used at relatively high solids contents, e.g. between 35 and 70%, preferably not less than 50%, although they may be diluted with water if desired.

The particle size of the latex can be regulated by the quantity of nonionic or anionic emulsifying agent or protective colloid employed. To obtain smaller particles sizes, greater amounts of emulsifying agents are used. As a general rule, the greater the amount of the emulsifying agent employed, the smaller the average particle size.

If desired, conventional additives may be incorporated into the novel adhesives of our invention in order to modify the properties thereof. Among these additives may be included thickeners, fillers or pigments, such as talc and clay, small amounts of tackifiers, etc.

The emulsion adhesive is useful on any conventional tape or other face stock, especially vinyl substrates such as vinyl films or foils. The adhesive may be applied using conventional techniques. Typical methods involve application of the adhesive onto a release liner by use of mechanical coating processes such as air knife, trailing blade, knife coater, reverse roll or gravure coating techniques. The adhesive is allowed to dry at room temperature and then oven dried at about 250° F. for 10 minutes. The coated release liner may then be laminated to the face stock by a nip roll using pressure between a rubber roll and a steel roll. This technique effects a transfer of the adhesive mass to the face stock with a minimum of penetration.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

EXAMPLE 1

This example illustrates the polymerization method used in preparing pressure sensitive adhesives of the present invention.

To a 10 liter autoclave was charged 675 g (of a 20% w/w solution in water) sodium alkyl aryl polyethylene oxide sulphate (3 moles ethylene oxide), 50 g (of a 70% w/w solution in water) alkyl aryl polyethylene oxide (30 moles ethylene oxide), 60 g (of a 25% w/w solution in water) sodium vinyl sulphonate, 0.5 g sodium acetate, 2 g sodium formaldehyde sulphoxylate, 5 g (of a 1% w/w solution in water) ferrous sulphate/solution and 1900 g water. After purging with nitrogen, 1575 g vinyl acetate and 1425 g di-2-ethylhexyl maleate were charged to the reactor. The reactor was then pressurized to 750 psi with ethylene and equilibrated at 50° C. for 15 minutes. The polymerization was then started by metering in a solution of 60 g tertiary butyl hydroperoxide in 290 g water and 45 g sodium formaldehyde sulphoxylate and 2 g sodium acetate in 225 g water over a period of 5 hours uniformly. Concurrently added over four hours was a solution of 100 g. acrylic acid and 100 g. hydroxypropyl acrylate in 300 g. water.

Once the addition of the initiators was started, the reaction temperature was raised to 80°-82° C. and kept at this temperature until the reaction was completed. At the end of the initiator slow additions, the product was transferred to an evacuated vessel (30 liter) to remove residual ethylene from the system. It was identified as Emulsion 1.

Using the general procedure described above, additional emulsions were prepared varying the amounts and/or monomeric compositions. The major monomers and their respective amounts are shown in Table I.

Also prepared as controls were emulsions representative of the prior art including Examples 8 through 15 illustrating acrylic compositions (Ex. 8 and 9), vinyl acrylic compositions (Ex. 10, 11, 12, 13) and ethylenevinyl acetate-acrylic compositions (Ex. 14 and 15), the latter prepared in accordance with the teachings of U.S. Pat. No. 4,322,516. Example 16 illustrates an industry standard for this end use supplied by Rohm and Haas. In addition, controls were prepared using di-iso-octyl maleate (Ex. 17), no carboxylic acid (Ex. 18) and maleic acid (Ex. 19), an unsaturated dicarboxylic acid.

TABLE I

| EX | EHA | DOM | DIOM | VA | E | MA | MEM | AA % | MAD | HPA | Tg. |
|---|---|---|---|---|---|---|---|---|---|---|---|
| (1) | — | 35 | — | 45 | 20 | — | — | 2.5 | — | 2.5 | −31 |
| (2) | — | 30 | — | 50 | 20 | — | — | 2.5 | — | 2.5 | −24 |
| (3) | — | 25 | — | 55 | 20 | — | — | 2.5 | — | 2.5 | −22 |
| (4) | — | 35 | — | 45 | 20 | — | — | 5 | — | — | −30 |
| (5) | — | 30 | — | 50 | 20 | — | — | 5 | — | — | −25 |
| (6) | — | 37.5 | — | 42.5 | 20 | — | — | 2 | — | 2 | −26 |
| (7) | — | 35 | — | 45 | 20 | — | 2 | — | — | 2 | −26 |
| (8) | 65 | — | — | — | — | 35 | — | — | — | — | −42 |
| (9) | 65 | — | — | — | — | 35 | — | 2.5 | — | — | −40 |
| (10) | 65 | — | — | 35 | — | — | — | — | — | — | −42 |
| (11) | 65 | — | — | 35 | — | — | — | 2.5 | — | — | −35 |
| (12) | 65 | — | — | 35 | — | — | — | 2.5 | — | 2 | −35 |
| (13) | 65 | — | — | 35 | — | — | — | 2.5 | — | 3 | −35 |
| (14) | 55 | — | — | 30 | 15 | — | — | 2.5 | — | — | −42 |
| (15) | 55 | — | — | 30 | 15 | — | — | 2.5 | — | 3 | −38 |
| (16) | Rohm and Haas E2219 and all-acrylic control | | | | | | | | | | |
| (17) | — | — | 35 | 45 | 20 | — | — | 2 | — | 2 | −21 |
| (18) | — | 40 | — | 40 | 20 | — | — | — | — | — | −26 |
| (19) | — | 35 | — | 45 | 20 | — | — | — | 2 | — | −22 |

Key:
EHA = 2 Ethylhexylacrylate
DOM = Di-2-ethylhexyl Maleate
VA = Vinyl Acetate
E = Ethylene
MA = Methyl Acrylate
AA = Acrylic Acid
HPA = Hydroxypropyl Acrylate
MEM = Monoethylmaleate
DIOM = Di-isooctyl maleate
MAD = Maleic acid The emulsion adhesive was then coated on a plasticized vinyl film and dried in an oven for 5 minutes at 105° C. The resulting dry adhesive deposition was 20 mg./in$^2$. This coating was then tested for peel strength according to the Pressure Sensitive Tape Council, Test Method No. 1, modified here to vary the dwell time between placing the coating in contact with the stainless steel test panel and measuring the peel strength. In addition the bonded test specimen was heat aged as indicated in Table II to accelerate any tendency to lose adhesion on aging on the PVC substrate due to plasticizer migration into the polymer.

TABLE II

| EX | INITIAL PEEL 20 MIN. (in lbs.) | 24 HRS. | PEEL 1 WK. AGED AT 70° C. 20 MIN. (in lbs.) | 24 HRS. | % RETENTION OF PEEL STRENGTH |
|---|---|---|---|---|---|
| 1 | 5.2 | 5.9 | 3.3 | 3.6 | 63 |
| 2 | 4.6 | 5.1 | 3.5 | 3.5 | 76 |
| 3 | 4.0 | 4.7 | 3.3 | 5.1 | 83 |
| 4 | 4.5 | 6.3 | 3.5 | 3.4 | 78 |
| 5 | 4.6 | 6.4 | 3.1 | 3.9 | 67 |
| 6 | 3.5 | 6.2 | 3.5 | 4.3 | 100 |
| 7 | 4.1 | 5.1 | 2.3 | 3.2 | 56 |
| 8 | 2.6 | — | 1.2 | — | 46 |
| 9 | 3.7 | 4.5 | 1.2 | — | 32 |
| 10 | 2.7 | — | 1.8 | — | 67 |
| 11 | 3.3 | — | 2.2 | — | 67 |
| 12 | 3.3 | 4.9 | 1.2 | 1.8 | 36 |
| 13 | 3.3 | 5.4 | 1.7 | 2.5 | 51 |
| 14 | 3.3 | 3.9 | 1.1 | 1.6 | 33 |
| 15 | 3.1 | 4.1 | 1.5 | 3.2 | 48 |
| 16 | 3.7 | 5.3 | 1.6 | 3.0 | 43 |
| 17 | 2.5 | 4.1 | 2.0 | 2.8 | 80 |
| 18 | 3.1 | 5.0 | 2.8 | 3.2 | 90 |
| 19 | 1.5 | 3.0 | 2.2 | 2.5 | 100 |

The results show the superior retention of adhesive properties of the instant polymers (compared to those of the prior art) when subjected to aging PVC film (vinyl). This is specifically shown by Examples 1 through 7 which illustrates the high initiial peel strengths (4-5 lbs.) and retention of 3-4 lbs. of this peel strength on aging relative to the prior art and controls of only 3-4 lb. initial peel strength and lower retention of peel strength on aging of 1-2 lb.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

I claim:

1. Plasticized polyvinyl chloride substrates coated with a pressure sensitive adhesive composition comprising an emulsion polymer of 30-70% by weight of a vinyl ester of a alkenoic acid selected from the group consisting of vinyl formate, vinyl acetate, vinyl propionate, vinyl butyrate, vinyl isobutyrate, vinyl valerate, vinyl-2-ethyl-hexanoate, vinyl isooctanoate, vinyl nonate, vinyl decanoate, vinyl pivalate, and vinyl versitate; 10-30% by weight ethylene; 20-40% by weight of a di-2-ethylhexyl maleate or the corresponding fumarate; 1 to 10% by weight of a mono-carboxylic acid selected from the group consisting of acrylic acid, methacrylic acid, monoethyl maleate, monobutyl maleate and monooctyl maleate; and 0-5% of a copolymerizable comonomer selected from the group consisting of acrylamide, allyl carbamate, N-methylol (meth)-acrylamide, N-vinylpyrrolidinone, diallyl adipate, triallyl cyanurate, butanediol diacrylate, allyl methacrylic, hydroxyethyl acrylate, hydroxy propyl acrylate and the corresponding methacrylates wherein the amount of the comonomer is such as to maintain the adhesive within a $T_g$ range of −45° to −25° C.

2. The substrate of claim 1 wherein the polyvinyl chloride substrate is plasticized with a migratory plasticizer.

3. The substrate of claim 2 wherein the plasticizer is a phthalate ester.

4. The substrate of claim 2 wherein the plasticizer is a polyester or an epoxidized soybean oil.

5. The substrate of claim 1 wherein the vinyl ester in the adhesive is vinyl acetate.

6. The substrate of claim 1 wherein the vinyl ester is present in the adhesive in an amount of 40 to 60% by weight.

7. The substrate of claim 1 wherein the maleate is present in the adhesive in an amount of 25 to 35% by weight.

8. The substrate of claim 1 wherein the acid is acrylic acid or monoethyl maleate.

9. The substrate of claim 1 wherein the adhesive additionally contains up to 5% of a copolymerizable comonomer selected from the group consisting of acrylamide, allyl carbamate, N-methylol (meth)-acrylamide, N-vinylpyrrolidinone, diallyl adipate, triallyl cyanurate, butanediol diacrylate, allyl methacrylate, hydroxyethyl acrylate, hydroxy propyl acrylate and the corresponding methacrylates and wherein the amount of the comonomer is such as to maintain the adhesive within a $T_g$ range of −45° to −25° C.

10. The substrate of claim 1 wherein the copolymerizable comonomer is hydroxyethyl acrylate or hydroxypropyl acrylate.

* * * * *